(No Model.)

I. S. LAUBACK.
GRATER.

No. 470,808. Patented Mar. 15, 1892.

WITNESSES:
John Becker
Fred White

INVENTOR:
Isaac S. Lauback,
By his Attorneys,
Arthur E. Fraser & Co.

UNITED STATES PATENT OFFICE.

ISAAC S. LAUBACK, OF NEW YORK, ASSIGNOR OF ONE-HALF TO ALTON H. FANCHER, OF BROOKLYN, NEW YORK.

GRATER.

SPECIFICATION forming part of Letters Patent No. 470,808, dated March 15, 1892.

Application filed November 12, 1891. Serial No. 411,665. (No model.)

*To all whom it may concern:*

Be it known that I, ISAAC S. LAUBACK, a citizen of the United States, residing in the city, county, and State of New York, have invented certain new and useful Improvements in Graters, of which the following is a specification.

This invention relates to culinary graters for grating nutmegs and other substances. Such a grater is shown in my application for patent filed July 8, 1891, Serial No. 398,827, in which there is a substantially circular grating-surface surrounded by a guideway, and a holder for the material to be grated adapted to be moved around over said surface and within said guideway.

My present invention aims to improve graters of this general character; and to this end in carrying out the preferred form of my invention I construct the grating-surface continuously and in the form of a circle or ellipse, and construct the holder to be moved around over this surface, as in my said application. Instead of relying on the guideway for guiding the holder in its movements, I provide a pivoted carrier connecting said surface and holder for guiding the latter. This is preferably a flat plate pivoted centrally of the grating-surface and movably engaging said holder to guide and steady it. Preferably tracks are formed on either side of the guiding-surface, on which tracks the inner end of the holder rides, and also, by preference, a guideway is formed exteriorly of the grating-surface for engaging the outer end of the carrier-plate.

Figure 1:
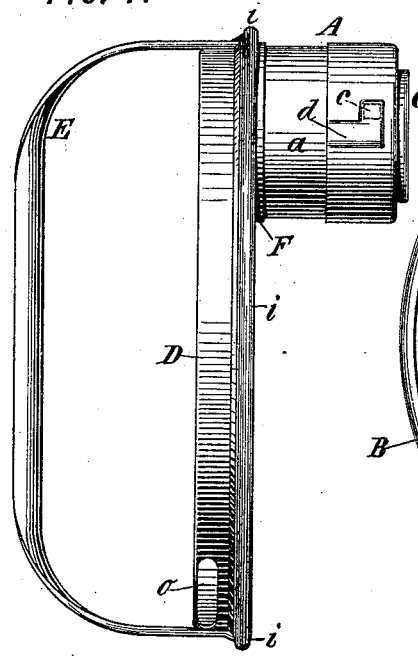
Figure 2:
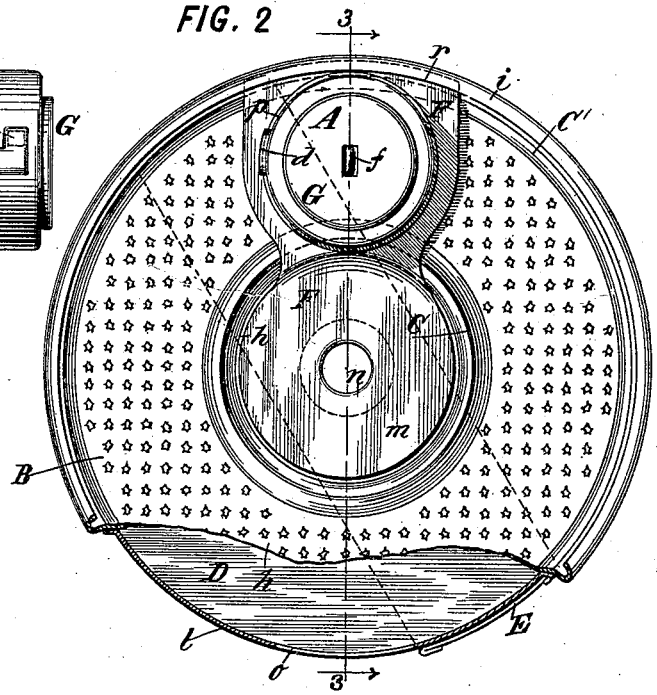
Figure 3:
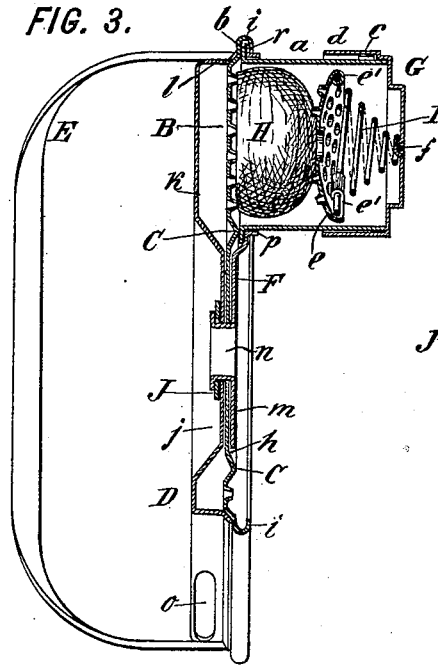
Figure 4:
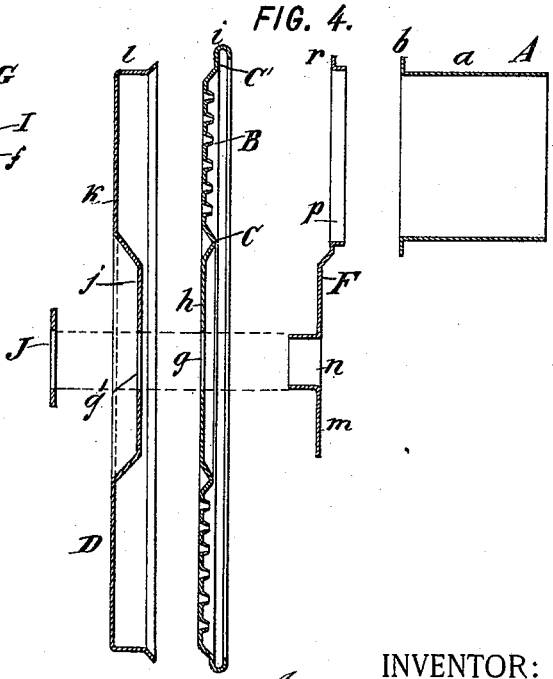

In the accompanying drawings, which illustrate the preferred form of my invention, Figure 1 is a side elevation of the grater. Fig. 2 is a face view thereof, partly broken away at the bottom. Fig. 3 is a vertical section cut on the line 3 3 in Fig. 2, and Fig. 4 is a sectional view of the several parts of the grater before being assembled.

Referring to the drawings, let A represent the holder for the material to be grated, B the grating-surface, and C C' endless tracks at either side of and surrounding the latter.

D is a box or receptacle secured to the back of the grating-surface for receiving the grated material and provided with a hole $o$ for discharging the latter.

E is any suitable handle for holding the grater. Preferably it is a U-shaped metal handle fastened against the diametrically-opposite sides of the grater at the back thereof and extending in such direction that it will stand at a slight inclination when the hole $o$ is at the lowermost side of the grater, as best seen in Fig. 2.

F is the carrier for the holder.

The holder A is constructed of tubular form and of sufficient size to receive the material to be grated. Preferably it consists of a body portion $a$, having a flange $b$ at its end adjacent to the grating-surface and a lug $c$ near its opposite end. A cap G closes the outer end of the holder A, and has a bayonet-groove $d$, engaging said lug $c$ for locking the cap to the body.

H represents a partially-grated nutmeg within the holder. For pressing this against the grating-surface a punctured plate $e$ is supplied, which is connected to the cap G by a spring I. This spring is preferably fastened to the cap by slightly indenting a portion of the metallic top of the latter and then running the smaller end of the spring through perforations in the sides of this indentation, as seen at $f$ in Figs. 2 and 3. From this point the spring I increases in diameter until it reaches the presser-plate $e$, to which it is secured by bending over the last coil of its wire one or more small ears or wings $e'$, which are provided on the plate $e$ for this purpose. Thus the plate is connected to the cap very economically and securely, while permitting the plate to be compressed to the extreme inner end of the cap. As the material is grated the plate $e$ moves toward the grating-surface until in contact therewith, whereby the material will be completely grated.

The grater proper consists, preferably, of a metallic disk having a central aperture $g$, a smooth annular portion $h$, surrounding the latter, raised annular tracks C, surrounding said portion $h$, annular grating-surface B exteriorly of said track, raised annular track C' exteriorly of said surface B, and an overturned outer edge $i$, constituting an annular guideway for the carrier F.

The receptacle D consists, preferably, of a single disk of metal having a raised central portion $j$, perforated at $g'$, an annular trough $k$ surrounding such portion, and an outer flange $l$ surrounding said trough, the whole being constructed to seat against and inclose the back of the grater-disk, as best seen in Figs. 3 and 4.

The body $a$ of the holder A is placed with its flange $b$ on the tracks C C′ over the grating-surface B. The carrier F, which is preferably a plain strip of sheet metal, is by preference constructed with an inner end $m$, fitting within the plain portion $h$ of the grater-disk and punctured centrally in such manner as to draw up a flange $n$ of such size as to freely enter the holes $g$ and $g'$ in the grater-disk and receptacle-disk. At its outer end the carrier F is raised sufficiently from the plane of the portion $m$ to ride freely over the tracks C C′ and the flange $b$ of the holder, and at this end it is provided with a flanged aperture $p$ of sufficient size to loosely and movably engage externally the body $a$ of the holder. The end $r$ of the carrier F projects slightly beyond the flange $b$ of the holder and takes under the guideway $i$ of the grater-disk, by which it is steadied and prevented from springing outwardly from the grating-surface. A washer J is placed at the back of the receptacle-disk, and the flange $n$ of the carrier F is passed through the holes $g$ in the grater-disk and $g'$ in the receptacle-disk and through the washer J, and is then turned down against the back of the latter, thus securing all the parts in position, as shown in Fig. 3, while giving a rotative or pivotal connection between the carrier and the grating-surface.

The connection between the holder A and the carrier F is sufficiently free to permit the rotation of the former independently of the latter, but is still sufficiently close to prevent any rattling or tilting of the holder as it traverses over the grating-surface. By this construction the holder may be held tightly in the hand of the operator by revolving on its own axis as it travels around the circuit of the grater, thus bringing that part of the grated material which at one side of the circuit is at the outside of the grater to an inside position at the opposite side of the circuit. This presents a constantly-changing portion of the material to the grating-teeth and prevents the mere grooving of the former by the latter.

In operation the grater is suspended with one hand by the handle E, the cap G is removed by turning it until its bayonet-joint connection is freed, the nutmeg is put into the body $a$ and the cap G replaced, and the holder is then grasped in the other hand of the operator and drawn around over the grating-surface until a sufficient quantity of the material has been grated.

My invention provides an extremely simple, cheap, durable, and efficient grater for culinary purposes, and one which can be operated with ease and steadiness.

The pivoted carrier connecting the holder with the grating-surface serves to take up much of the friction that would otherwise tend to interfere with the operation of the grater, and also prevents the holder from binding as it is guided around the surface. By thus connecting the parts the loss of either is prevented.

What I claim is, in a grater, the following defined novel features and combinations, substantially as hereinbefore set forth, namely:

1. In a grater, the combination, with a grating-surface and a holder for retaining the material to be grated in contact with said surface, of a carrier pivotally connected to said surface and movably engaging said holder, whereby the latter may be moved independently of said carrier, and a guideway on said surface engaging said carrier for steadying the latter in its movement.

2. In a grater, the combination, with a grating-surface and a holder for retaining the material to be grated in contact with said surface, of a pivoted carrier connecting said surface and holder, and a guideway engaging the outer part of said carrier.

3. In a grater, the combination, with a grating-surface, of a circular track adjacent thereto, a holder for holding the material to be grated against said surface, movable over the latter and on said track, and a pivoted carrier engaging said holder and adapted to preserve the latter in position over said surface and track, and an annular guideway engaging said carrier for preventing its displacement relatively to said track.

4. In a grater, the holder, the grater-disk, and the separate receptacle-disk adapted to fit against the back thereof, in combination with the pivoted carrier F, arranged at the front of said grater-disk, engaging said holder, and pivotally connected to the grater by a pivotal connection passing through said disks and secured at the back of the receptacle-disk, whereby when the carrier is pivoted to the grater said parts are locked in position by the pivotal connection for the carrier, substantially as and for the purpose set forth.

5. In a grater, the combination, with a grater-disk having an annular grating-surface B, a flat central portion $h$, and an annular track C, inclosing the latter and between it and the surface B, and a holder for holding the material to be grated against said surface, of the carrier F for said holder, pivoted to the grater-disk and constructed with the enlarged end $m$, adapted to fit against the portion $h$ of the disk within the track C for steadying the carrier in its movement.

6. In a grater, the combination, with a grater-disk having an annular grating-surface B and an overturned edge $i$, constituting an annular guideway surrounding such surface, and a holder for holding the material to be grated over said surface, of a pivoted carrier for said holder, pivoted to the grater at its inner end, engaging said holder and terminating in a broad end $r$ beyond the latter and under the overhanging edge $i$, substantially as and for the purpose set forth.

7. In a grater, the grating-surface, in combination with the holder A, consisting of a cylindrical body $a$, cap G, pusher-plate $e$, and helical spring I, connected at its large end to the outer portion of said plate and at its smaller end to the top of said cap by passing over the indented portion $f$ in the latter, substantially as and for the purpose set forth.

8. In a grater, the grating-surface, in combination with the holder A, consisting of a cylindrical body $a$, cap G, pusher-plate $e$, having ears $e'$ $e'$, and helical spring I, connected at its large end to said plate $e$ by having its wire clamped under said ears and connected at its smaller end to said cap, substantially as and for the purpose set forth.

In witness whereof I have hereunto signed my name in the presence of two subscribing witnesses.

ISAAC S. LAUBACK.

Witnesses:
 CHARLES K. FRASER,
 GEORGE H. FRASER.